(12) United States Patent
Saracco et al.

(10) Patent No.: US 9,356,418 B2
(45) Date of Patent: May 31, 2016

(54) ALL FIBER LOW DYNAMIC POINTING HIGH POWER LMA FIBER AMPLIFIER

(71) Applicant: nLight Photonics Corporation, Vancouver, WA (US)

(72) Inventors: Matthieu Saracco, Vancouver, WA (US); David Logan, Vancouver, WA (US); Timothy S. McComb, Portland, OR (US); Jared Green, Corbett, OR (US)

(73) Assignee: nLIGHT, Inc., Vancouver, WA (US)

( * ) Notice: Subject to any disclaimer, the term of this patent is extended or adjusted under 35 U.S.C. 154(b) by 0 days.

(21) Appl. No.: 14/144,396

(22) Filed: Dec. 30, 2013

(65) Prior Publication Data

US 2014/0185132 A1  Jul. 3, 2014

Related U.S. Application Data

(60) Provisional application No. 61/747,954, filed on Dec. 31, 2012.

(51) Int. Cl.
*H01S 3/00* (2006.01)
*H01S 3/067* (2006.01)
(Continued)

(52) U.S. Cl.
CPC ......... *H01S 3/06754* (2013.01); *H01S 3/06733* (2013.01); *H01S 3/094007* (2013.01); *H01S 3/09408* (2013.01); *H01S 3/09415* (2013.01); *H01S 3/094011* (2013.01); *H01S 3/094019* (2013.01)

(58) Field of Classification Search
CPC ............ H01S 3/06754; H01S 3/06733; H01S 3/094007; H01S 3/094011; H01S 3/094019; H01S 3/09408; H01S 3/09415

USPC ........................................................ 359/341.1
See application file for complete search history.

(56) References Cited

U.S. PATENT DOCUMENTS

| 3,505,046 A | 4/1970 | Phaneuf |
| 4,046,537 A | 9/1977 | Deserno et al. |
| 4,072,399 A | 2/1978 | Love |

(Continued)

FOREIGN PATENT DOCUMENTS

| RU | 2176840 C2 | 12/2001 |
| WO | WO 92/10014 | 6/1992 |

(Continued)

OTHER PUBLICATIONS

Jauregui et al., "All-Fiber Side Pump Combiner for High Power Fiber Lasers and Amplifiers," Proc. of SPIE, 7580:75801E-1-75801E-8 (2010).

(Continued)

*Primary Examiner* — Mark Hellner
(74) *Attorney, Agent, or Firm* — Klarquist Sparkman, LLP (57) ABSTRACT

High power fiber lasers include large or very large mode area active fibers. Mode preserving pump combiners are situated to counter-pump the active fiber using one or more pump sources. The mode preserving pump combiners preserve single mode propagation in a signal fiber, and such combiners can be identified based on optical spectra, beam quality, or temporal response. Active fibers can also be included in a pump combiner so that the active fiber is splice free from an input end that receives a seed pulse to an output end. Peak powers of over 100 kW can be obtained.

29 Claims, 11 Drawing Sheets

(51) Int. Cl.
*H01S 3/094* (2006.01)
*H01S 3/0941* (2006.01)

(56) References Cited

U.S. PATENT DOCUMENTS

| | | |
|---|---|---|
| 4,179,185 A | 12/1979 | Hawk |
| 4,773,924 A | 9/1988 | Berkey |
| 4,818,062 A | 4/1989 | Scifres et al. |
| 5,011,251 A | 4/1991 | Miller et al. |
| 5,017,206 A | 5/1991 | Miller et al. |
| 5,153,932 A | 10/1992 | Blyler, Jr. et al. |
| 5,239,176 A | 8/1993 | Stevenson |
| 5,259,046 A | 11/1993 | DiGiovanni et al. |
| 5,295,210 A | 3/1994 | Nolan et al. |
| 5,295,211 A | 3/1994 | Weidman |
| 5,305,414 A | 4/1994 | Higby et al. |
| 5,408,554 A | 4/1995 | Cyran et al. |
| 5,448,673 A | 9/1995 | Murphy et al. |
| 5,461,692 A | 10/1995 | Nagel |
| 5,568,318 A | 10/1996 | Leger et al. |
| 5,579,422 A | 11/1996 | Head et al. |
| 5,629,997 A | 5/1997 | Hardy |
| 5,664,037 A | 9/1997 | Weidman |
| 5,668,903 A | 9/1997 | Neuberger et al. |
| 5,715,270 A | 2/1998 | Zediker |
| 5,729,643 A | 3/1998 | Hmelar et al. |
| 5,734,766 A | 3/1998 | Flint |
| 5,745,284 A | 4/1998 | Goldberg et al. |
| 5,818,630 A | 10/1998 | Fermann et al. |
| 5,825,803 A | 10/1998 | Labranche |
| 5,864,644 A | 1/1999 | DiGiovanni et al. |
| 5,867,305 A | 2/1999 | Waarts et al. |
| 5,873,923 A | 2/1999 | DiGiovanni |
| 5,887,097 A | 3/1999 | Henry et al. |
| 5,935,288 A | 8/1999 | DiGiovanni et al. |
| 5,949,932 A | 9/1999 | Lawrenz-Stolz |
| 6,031,953 A | 2/2000 | Rekow et al. |
| 6,044,096 A | 3/2000 | Wolak et al. |
| 6,078,716 A | 6/2000 | Huang et al. |
| 6,101,199 A | 8/2000 | Wang et al. |
| 6,134,362 A | 10/2000 | Au-Yeung et al. |
| 6,198,858 B1 | 3/2001 | Pan et al. |
| 6,272,268 B1 | 8/2001 | Miller et al. |
| 6,278,816 B1 | 8/2001 | Keur et al. |
| 6,292,608 B1 | 9/2001 | Toh |
| 6,373,868 B1 | 4/2002 | Zhang |
| 6,385,371 B1 | 5/2002 | Li |
| 6,397,636 B1 | 6/2002 | DiGiovanni et al. |
| 6,404,954 B1 | 6/2002 | Zhu et al. |
| 6,421,489 B1 | 7/2002 | Berkey et al. |
| 6,434,295 B1 | 8/2002 | MacCormack et al. |
| 6,434,302 B1 | 8/2002 | Fidric et al. |
| 6,477,295 B1 * | 11/2002 | Lang et al. ............... 385/31 |
| 6,496,301 B1 | 12/2002 | Koplow et al. |
| 6,516,124 B2 | 2/2003 | Po |
| 6,532,244 B1 | 3/2003 | Dewey et al. |
| 6,608,951 B1 | 8/2003 | Goldberg et al. |
| 6,666,590 B2 | 12/2003 | Brosnan |
| 6,668,112 B1 | 12/2003 | Kaneda |
| 6,700,709 B1 | 3/2004 | Fermann |
| 6,731,837 B2 | 5/2004 | Goldberg et al. |
| 6,778,732 B1 | 8/2004 | Fermann |
| 6,816,652 B1 | 11/2004 | Lin et al. |
| 6,868,236 B2 | 3/2005 | Wiltsey et al. |
| 6,907,163 B2 | 6/2005 | Lewis |
| 6,956,876 B1 | 10/2005 | Aquaro et al. |
| 6,970,624 B2 | 11/2005 | DiGiovanni et al. |
| 6,990,278 B2 | 1/2006 | Vakili et al. |
| 7,016,573 B2 | 3/2006 | Dong et al. |
| 7,046,432 B2 | 5/2006 | Starodoumov |
| 7,046,875 B2 | 5/2006 | Gonthier et al. |
| 7,209,615 B2 | 4/2007 | Fishteyn |
| 7,221,822 B2 | 5/2007 | Borisovich et al. |
| 7,236,671 B2 | 6/2007 | Rasmussen |
| 7,272,956 B1 | 9/2007 | Anikitchev et al. |
| 7,327,920 B2 | 2/2008 | Dong et al. |
| 7,336,872 B1 | 2/2008 | Malo |
| 7,420,996 B2 | 9/2008 | Schulte et al. |
| 7,436,868 B2 | 10/2008 | Schulte et al. |
| 7,437,046 B2 | 10/2008 | DiGiovanni et al. |
| 7,443,895 B2 | 10/2008 | Schulte et al. |
| 7,526,165 B2 | 4/2009 | Nielsen et al. |
| 7,532,792 B2 | 5/2009 | Skovaard et al. |
| 7,539,377 B2 | 5/2009 | Gonthier |
| 7,561,769 B2 | 7/2009 | Fujimoto et al. |
| 7,574,087 B2 | 8/2009 | Inoue et al. |
| 7,586,963 B2 | 9/2009 | Schulte et al. |
| 7,606,452 B2 | 10/2009 | Bilodeau et al. |
| 7,637,126 B2 | 12/2009 | Koeppler et al. |
| 7,729,574 B2 | 6/2010 | Moriarty |
| 7,760,978 B2 | 7/2010 | DiGiovanni et al. |
| 7,787,733 B2 | 8/2010 | DiGiovanni et al. |
| 7,957,432 B2 | 6/2011 | Seo et al. |
| 7,991,255 B2 | 8/2011 | Salokative |
| 8,068,705 B2 | 11/2011 | Gapontsev et al. |
| 8,213,070 B2 | 7/2012 | Koplow |
| 8,248,688 B2 | 8/2012 | Baird et al. |
| 8,346,038 B2 | 1/2013 | Gonthier |
| 8,433,168 B2 | 4/2013 | Filippov et al. |
| RE44,262 E * | 6/2013 | Gonthier et al. ............... 385/28 |
| 8,457,456 B2 | 6/2013 | Kopp et al. |
| 8,472,765 B2 | 6/2013 | Holland |
| 8,483,533 B1 | 7/2013 | Mehl |
| 8,498,046 B2 | 7/2013 | Dong et al. |
| 8,711,471 B2 | 4/2014 | Liu et al. |
| 2002/0172486 A1 | 11/2002 | Fermann |
| 2003/0031442 A1 | 2/2003 | Siegman |
| 2004/0228593 A1 | 11/2004 | Sun et al. |
| 2005/0008044 A1 | 1/2005 | Fermann et al. |
| 2005/0041702 A1 | 2/2005 | Fermann et al. |
| 2005/0226286 A1 | 10/2005 | Liu et al. |
| 2005/0265653 A1 | 12/2005 | Cai et al. |
| 2005/0265678 A1 | 12/2005 | Manyam et al. |
| 2007/0062222 A1 | 3/2007 | Janka et al. |
| 2007/0086501 A1 | 4/2007 | Karlsen |
| 2007/0116071 A1 | 5/2007 | Schulte et al. |
| 2007/0116077 A1 | 5/2007 | Farmer et al. |
| 2007/0196062 A1 | 8/2007 | Inoue et al. |
| 2007/0237453 A1 | 10/2007 | Nielsen et al. |
| 2008/0050069 A1 | 2/2008 | Skovgaard et al. |
| 2008/0063348 A1 | 3/2008 | Kumano et al. |
| 2008/0118213 A1 | 5/2008 | Andrieu et al. |
| 2008/0166094 A1 | 7/2008 | Bookbinder et al. |
| 2008/0170823 A1 | 7/2008 | Gonthier |
| 2009/0003788 A1 | 1/2009 | Galvanauskas |
| 2009/0010286 A1 | 1/2009 | Messaddeq et al. |
| 2009/0060417 A1 | 3/2009 | Bilodeau et al. |
| 2009/0092365 A1 | 4/2009 | Donlagic |
| 2009/0136176 A1 | 5/2009 | Kopp et al. |
| 2009/0202204 A1 * | 8/2009 | Nielsen et al. ............... 385/43 |
| 2010/0111118 A1 | 5/2010 | Seo et al. |
| 2010/0142894 A1 | 6/2010 | Gonthier |
| 2010/0247047 A1 | 9/2010 | Filippov et al. |
| 2010/0278486 A1 | 11/2010 | Holland |
| 2011/0032602 A1 | 2/2011 | Rothenberg |
| 2011/0032603 A1 | 2/2011 | Rothenberg |
| 2011/0032604 A1 | 2/2011 | Rothenberg et al. |
| 2011/0058250 A1 | 3/2011 | Liu et al. |
| 2011/0069723 A1 | 3/2011 | Dong et al. |
| 2011/0100066 A1 | 5/2011 | Bohme et al. |
| 2011/0157671 A1 | 6/2011 | Koplow |
| 2011/0305250 A1 * | 12/2011 | Chann et al. ............... 372/6 |
| 2012/0127563 A1 | 5/2012 | Farmer et al. |
| 2012/0219026 A1 | 8/2012 | Saracco et al. |
| 2012/0230352 A1 | 9/2012 | Minelly et al. |
| 2012/0260781 A1 | 10/2012 | Price et al. |
| 2012/0262781 A1 * | 10/2012 | Price et al. ............... 359/341.3 |
| 2013/0287338 A1 * | 10/2013 | Majid et al. ............... 385/31 |
| 2014/0119694 A1 * | 5/2014 | Abedin et al. ............... 385/43 |

FOREIGN PATENT DOCUMENTS

| | | |
|---|---|---|
| WO | WO 97/42533 | 11/1997 |
| WO | WO 2005/022705 | 3/2005 |

(56) References Cited

FOREIGN PATENT DOCUMENTS

| WO | WO 2009/043968 | 4/2009 |
| --- | --- | --- |
| WO | WO 2011/066440 | 6/2011 |
| WO | WO 2013/102033 | 7/2013 |

OTHER PUBLICATIONS

"Pump and Signal Taper for Airclad Fibers Final Report," Air Force Research Laboratory, 8 pages (May 1, 2006).

International Search Report from PCT Publication No. PCT/US2013/077242, 2pp. (dated May 22, 2014).

International Search Report from PCT Publication No. PCT/US2013/077243, 2pp. (dated Apr. 17, 2014).

Written Opinion from PCT Publication No. PCT/US2013/077242, 4pp. (dated May 22, 2014).

Written Opinion from PCT Publication No. PCT/US2013/077243, 4pp. (dated Apr. 17, 2014).

Eidam et al., "Femtosecond fiber CPA system emitting 830 W average output power," Opt. Lett. 35:94-96 (2010).

Geshiro et al., "Analysis of wave modes in slab waveguide with truncate parabolic index," IEEE Jouranl of Quantum Electronics, 10(9):647-649, 1974.

Geshiro et al., "Truncated parabolic-index fiber with minimum mode dispersion," IEEE Transaction on Microwave Theory and Technology, 26(2):115-119, 1978.

International Search Report from International Application No. PCT/US2013/030569, dated Jul. 4, 2013, 3 pp.

International Search Report from International Application No. PCT/US2012/072003, dated Apr. 4, 2013, 2 pp.

Niels Asger Mortensen, "Air-clad fibers: pump absorption assisted by chaotic wave dynamics?," Optics Express, vol. 15, No. 14, Jul. 9, 2007 (published Jul. 5, 2007).

nLIGHT Corporation, "nLIGHT Introduces New Line of All Fiber Mode Field Tapers" Jan. 23, 2009 News Release, http://nlight.net/new/releases/92~nLIGHT-Introduces-New-Line-of-All-Fiber-Mode-Field, downloaded Jan. 18, 2014.

nLIGHT, spreadsheet listing order dates for tapers.

Russbueldt et al., "400 W Yb:YAG Innoslab fs-amplifier," Optics Express, vol. 17(15):12230-12245 (2009).

Stolzenburg et al., "Picosecond Regenerative Yb:YAG Thin Disk Amplifier at 200 kHz Repetition Rate and 62 W Output Power," Advanced Solid-State Photonics, OSA Tech Digest, MA6 (2007).

Written opinion from International Application No. PCT/US2012/072003, dated Apr. 4, 2013, 3 pp.

Written Opinion from International Application No. PCT/US2013/030569, dated Jul. 4, 2013, 5 pp.

\* cited by examiner

ALL FIBER LOW DYNAMIC POINTING HIGH POWER LMA FIBER AMPLIFIER

CROSS-REFERENCE TO RELATED APPLICATION

This application claims the benefit of U.S. Provisional Patent Application 61/747,954, filed Dec. 31, 2012, and is related to U.S. Patent Application Publication 20110058250. Both applications are incorporated herein by reference.

FIELD

The disclosure pertains to optical fiber amplifiers and lasers.

BACKGROUND

Figure 1:
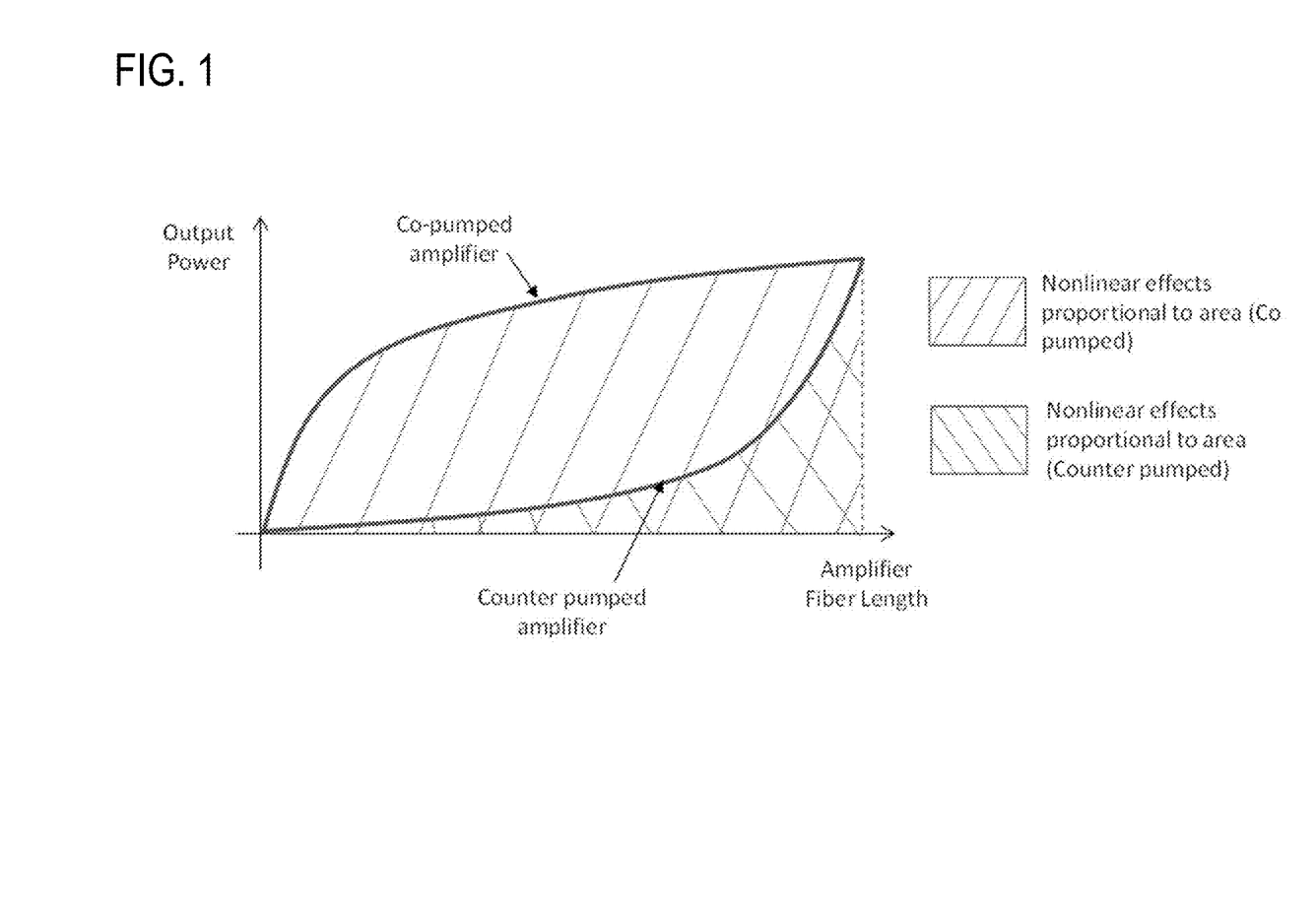
FIG. 1 is a graph of output power verses amplifier fiber length for determination of relative strength of non-linear effects for co-pumped and counter-pumped fiber amplifiers.

Conventional fiber lasers use actively doped fiber amplifiers that offer limited peak powers. Such fiber amplifiers typically include a seed laser, an active fiber or active fiber taper, one or many laser diode pumps, and a pump multiplexer. For pulsed applications, so-called large mode area (LMA) fibers are preferred to enable high peak powers by reducing nonlinear effects that are dependent on beam mode field diameter (MFD) and effective length of the amplifier fiber. Counter-pumped configurations can be used instead of co-pumped configurations to increase the threshold of nonlinearities, typically by a factor of about 3. FIG. 1 illustrates the relationship between output power, fiber length, and non-linear thresholds. For counter pumping a fiber amplifier, free space optics are typically used, requiring relatively complex fiber holding fixtures and complex free space optics. Thermal management becomes a challenge as pump power increases. For example, thermally induced mechanical drifts cause coupling losses and power-dependent ("dynamic") beam pointing. In addition, free space optical pumping schemes require complex tooling for adjustment and alignment. Providing a suitable end cap can also be difficult as the length of the end cap is limited by the numerical aperture of the pump light and complex, bulky end caps are typically required to permit sufficient signal beam expansion to avoid optical damage.

SUMMARY

Pulsed fiber lasers comprise a seed pulse source and an active fiber coupled to receive a seed pulse from the seed source. A mode preserving pump combiner is coupled to the active fiber and to at least one pump source, wherein the pump combiner includes a signal fiber coupled to the active fiber and configured to deliver an output beam, and at least one pump fiber coupled to at least one pump source so as to deliver pump radiation to the active fiber. In some examples, the signal fiber is a large mode area fiber, a double clad fiber, or a very large mode area fiber. In representative embodiments, a laser wavelength is 1064 nm, and the signal fiber produces a peak output power of at least 100 kW. In further examples, the mode preserving pump combiner produces a transmitted seed pulse with an $M^2$ value of less than 1.25. In additional embodiments, the signal fiber of the mode preserving pump combiner is coupled to the active fiber with a mode-preserving splice and the seed pulse is coupled to a seed fiber, and the seed fiber is coupled to the active fiber with a mode-preserving splice. In further embodiments, an end cap is secured to an output end of the signal fiber, the end cap having a diameter corresponding to a diameter of the signal fiber. In some examples, the active fiber is a tapered fiber and the active fiber is counter-pumped.

Pulsed fiber lasers comprise a seed pulse source, a pump source, and an active fiber coupled to receive a seed pulse from the seed source. A pump combiner having at least one pump fiber is coupled to the pump source so as to deliver pump radiation to the active fiber, wherein the active fiber extends into the pump combiner as a signal fiber. In some examples, the active fiber extends through the combiner, and is configured to deliver an output beam. In other embodiments, an end cap is situated at an output end of the active fiber, wherein the end cap has a diameter corresponding to a diameter of the active fiber. In additional examples, the seed pulse source is coupled to a fiber pigtail, and a splice couples the fiber pigtail to the active fiber. In representative examples, the active fiber is splice-free between the splice at the fiber pigtail and the end cap. In further examples, the active fiber is a large mode area or very large mode area fiber between the seed laser and the pump combiner, and is a tapered fiber between the pump combiner and the end cap. In some embodiments, the pump combiner is a mode preserving pump combiner and a peak output power is at least 10 kW. In typical examples, the active fiber is counter-pumped.

Methods comprise selecting a mode-preserving pump combiner having a signal fiber and a pump fiber and coupling the signal fiber to an active fiber and the pump fiber to a pump source. In some examples, the mode-preserving pump combiner is selected based on at least one $M^2$ value along a beam profile or is selected based on $M^2$ values along orthogonal axes of a beam profile. Typically, the $M^2$ values are less than about 1.25. In other examples, the mode-preserving pump combiner is selected based on spectral ripple in response to a broadband beam propagating in the signal fiber or a temporal characteristic of an optical beam transmitted by the signal fiber.

The foregoing and other objects, features, and advantages of the invention will become more apparent from the following detailed description, which proceeds with reference to the accompanying figures.

DETAILED DESCRIPTION

The following disclosure is presented in the context of representative embodiments that are not to be construed as being limiting in any way. This disclosure is directed toward all novel and non-obvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

Although the operations of the disclosed methods are described in a particular, sequential order for convenient presentation, it should be understood that this manner of description encompasses rearrangement of the operations, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other things and methods.

This disclosure sometimes uses terms like "produce," "generate," "select," "receive," "exhibit," and "provide" to describe the disclosed methods. These terms are high-level abstractions of the actual operations that are performed. The actual operations that correspond to these terms may vary depending on the particular implementation and are readily discernible by one of ordinary skill in the art.

The singular forms "a," "an," and "the" include the plural forms unless the context clearly dictates otherwise. The term "includes" means "comprises." Unless the context dictates otherwise, the term "coupled" means mechanically, electrically, or electromagnetically connected or linked and includes both direct connections or direct links and indirect connections or indirect links through one or more intermediate elements not affecting the intended operation of the described system.

Certain terms may be used such as "up," "down," "upper," "lower," and the like. These terms are used, where applicable, to provide some clarity of description when dealing with relative relationships. But, these terms are not intended to imply absolute relationships, positions, and/or orientations.

The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, percentages, temperatures, times, and so forth, as used in the specification or claims are to be understood as being modified by the term "about" or "approximately." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

Examples are described below with reference to optical amplifiers that are pumped with laser diode radiation at wavelengths between about 700 nm and 1 μm. Optical fibers configured for operation at wavelengths between about 500 nm and 2 μm and having core diameters greater than 25 μm are referred to as very large mode area fibers ("VLMA fibers"); optical fibers having core diameters between 10 μm and 25 μm are referred to as large mode area fibers ("LMA fibers"). An n+1:1 pump combiner can include an LMA or VLMA signal fiber (such as a double clad polarization maintaining LMA or VLMA fiber) to enable higher peak powers and longer fiber lengths by decreasing nonlinear effects. Conventional n+1:1 pump combiners typically include small mode area (less than 10 μm) single mode signal fibers that are limited in peak power. In some examples, an n+1:1 combiner includes an active LMA or VLMA signal fiber so that fiber splices are not required to couple an active fiber to a pump combiner. Splices tend to degrade beam quality, increase local intensity, and thus tend to increase nonlinear effects. An active fiber based pump combiner permits even higher peak power without altering the beam quality caused by a splice. Representative active fiber lasers are described below. In some examples, pump combiners are configured to preserve signal fiber beam quality and significantly reduce power coupling into modes other than a fundamental mode. Fiber lasers can also include active fibers that extend into and are part of a pump combiner so that an unspliced active fiber can extend from a seed laser to an output. Tapered active fibers can be used to reduce peak intensities. Smaller signal fiber core diameters (less than about 25 μm) tend to avoid coupling into higher order modes and can be used, but due to their smaller core diameters, tend to be limited in peak power. Fibers can be spliced so as to reduce dopant blooming and power coupling into higher order modes. A beam quality factor ($M^2$) can be evaluated along one or more cross-sectional axes of a seed laser beam transmitted through a pump combiner to evaluate splices and pump combiners. A pulse response approach to evaluation is also described below. As disclosed herein, pulsed active fiber lasers can be produced having peak powers of 50 kW, 100 kW, 150 kW, 200 kW, or more without limiting due to non-linear effects, with beam quality factors $M^2$ that are less than 1.30, 1.25, 1.20, or 1.15.

Figure 2:
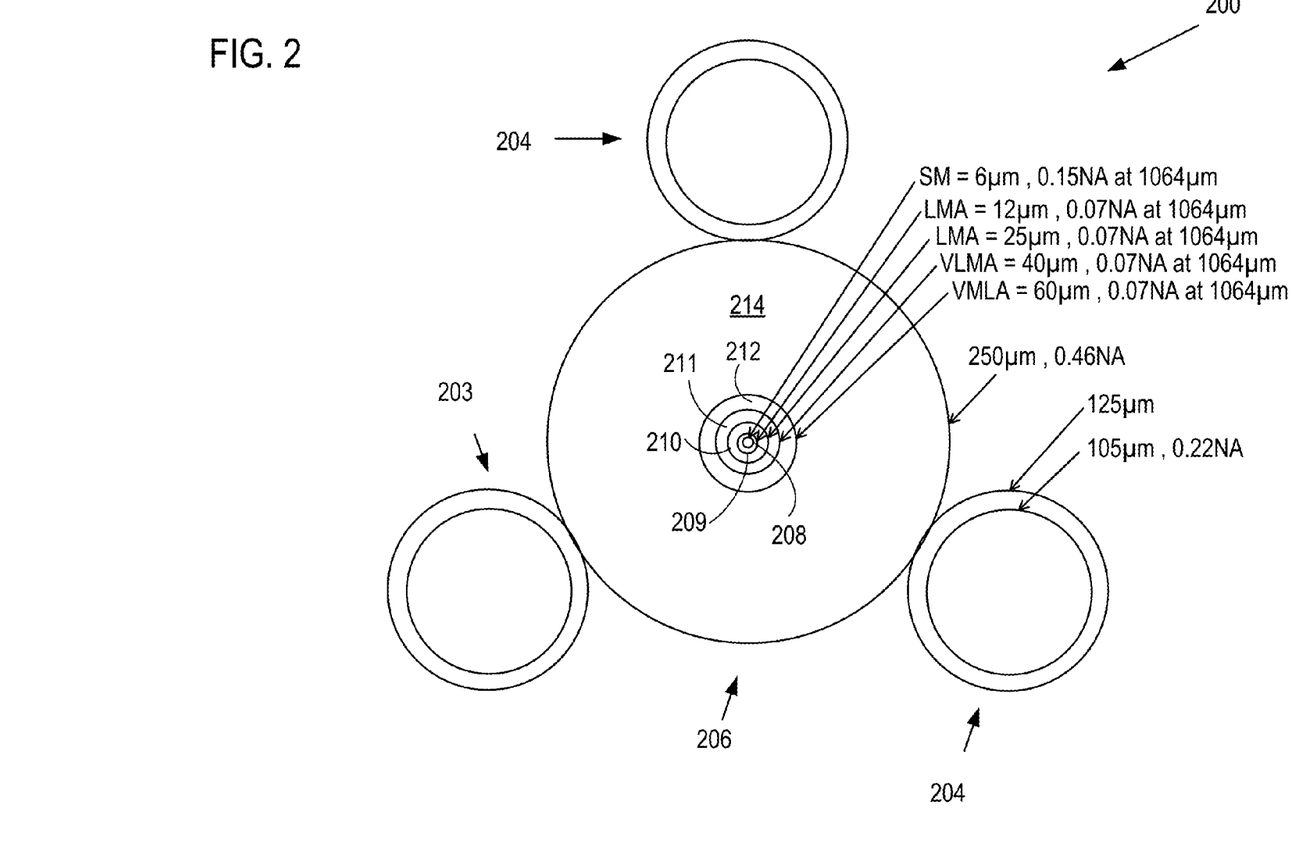
FIG. 2 illustrates 3+1:1 fiber combiners that include a central single mode fiber and large mode area (LMA) and very large mode area (VLMA) fibers.

FIG. 2 is a cross-sectional view illustrating construction of a 3+1:1 combiner 200 that includes 3 pump fibers 202-204 and a double clad signal fiber 206. The pump fibers 202-204 are shown as having 105 μm core diameters and 125 μm cladding diameters. For purposes of illustration, the double clad fiber 206 is shown with fiber cores 208-212 having diameters of 6 μm (single mode), 12 μm and 25 μm (LMA), and 40 μm and 60 μm (VLMA). The double clad fiber is illustrated as having a 250 μm cladding diameter. Numerical apertures are listed in FIG. 2. The LMA and VLMA core diameters permit high peak power for material processing and other applications. The diameters and numerical apertures shown are examples only, and fibers having other values can be used.

A VLMA or LMA core of the double clad signal fiber 206 can be an actively doped fiber, and tapered to increase mode field diameter. An active fiber is then integral with the combiner 200 and fiber splices are not needed to couple the combiner and the active fiber. Beam quality is typically degraded by splicing so such construction permits higher power operation.

Figure 3:
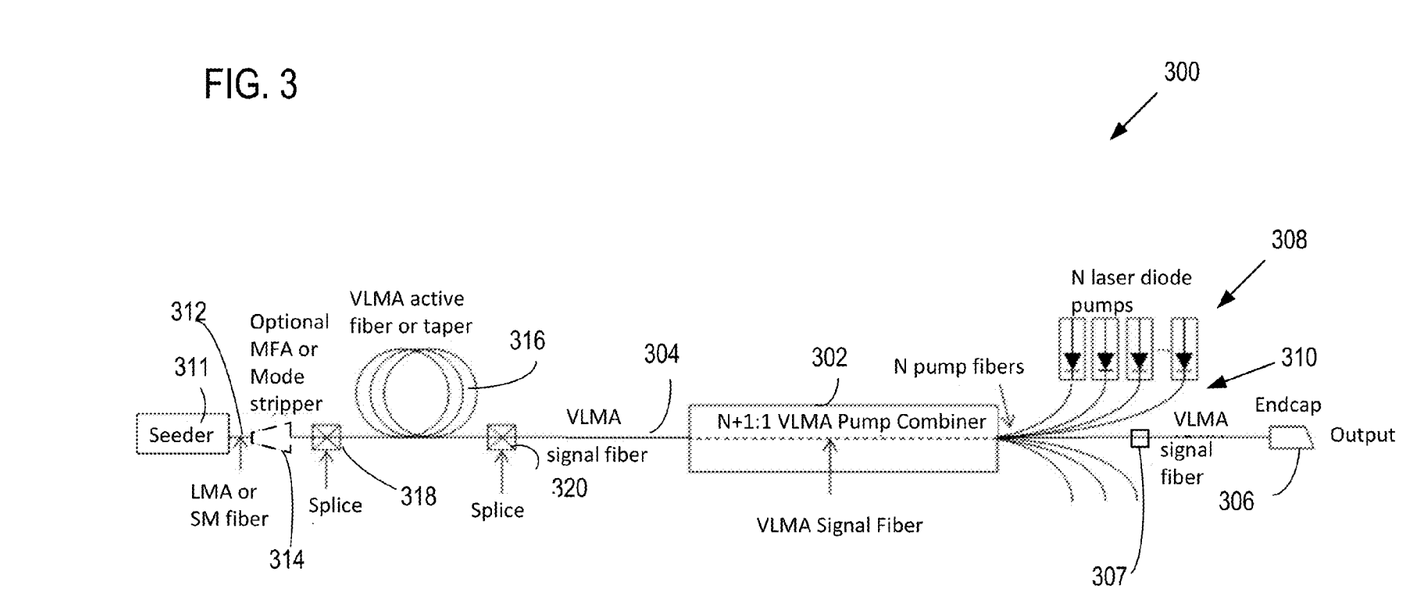
FIG. 3 illustrates a counter-pumped fiber amplifier that includes a VLMA active fiber and an n+1:1 pump combiner that includes a VLMA signal fiber.

With reference to FIG. 3, a representative counter-pumped n+1:1 fiber amplifier 300 includes a combiner 302 having a VLMA signal fiber 304 that extends through the combiner 302 and is terminated with an end cap 306. A cladding mode stripper 307 can be provided prior to the end cap 306. In some examples, a high order mode (HOM) filter or a mode scrambler can be provided instead of or in addition to a cladding mode stripper 307. Laser diodes 308 are coupled by pump fibers 310 to the pump combiner 302. Any pump fibers not used for pumping can be used to monitor laser operation. A core size of the VLMA signal fiber 304 in the combiner 302 is scaled to enable high peak power operation. The fiber amplifier 300 includes a seed source such as a seed laser 311 that may or may not provide a single mode beam. The seed laser 311 is coupled to a fiber pigtail 312 (such as an LMA or SM fiber) and the fiber pigtail wrapped onto a mode stripper 314 to remove higher order modes and favor propagation in the fundamental mode. The fiber pigtail 312 is coupled to a VLMA active fiber 316 (or active fiber taper) with a splice 318. If the fibers 312, 316 have different mode field diameters, a mode field adaptor (MFA) can be included for better beam quality and to reduce coupling to higher order modes, but is not shown in FIG. 3. The active VLMA fiber 316 (or active fiber taper) is typically wrapped on a mode stripper as well. A splice 320 couples the active VLMA fiber 316 to the VLMA signal fiber 304. The active fiber 316 can be a polarization maintaining fiber, if desired. The pump combiner 302 can include one or more different pump fibers such as combinations of 105 µm and 200 µm core fibers, or fibers having larger core diameters. As shown in FIG. 3, the signal fiber 304 is a double clad fiber and extends from the splice 320 to the end cap 306 without additional splices that can degrade beam quality. The signal fiber 304 can be terminated proximate the pump combiner 302 with the end cap 306 to protect the fiber output surface against optical damage.

Launch conditions in a VLMA fiber amplifier such as that of FIG. 3 can be important in achieving acceptable beam quality. As noted above, mode strippers and/or mode field adapters can be used. Splicing VLMA fibers can be challenging as splices such as the splice 320 must not introduce unacceptable beam defects. The active VLMA fiber 316 is typically coiled to preserve or improve beam quality as beams can propagate in VLMA fibers without significant loss in modes other than the fundamental mode. Coiling an active fiber with a radius that induces losses in higher order modes thus promotes beam quality. The quality of the splice 320 can determine overall beam quality as power density is highest at this location. Higher order modes can be generated at this splice. Splice quality can be improved using a so-called "cold splicing" in which a lower arc power (i.e., a lower fiber fusion temperature) is used for a longer duration. Such splices can also be made using flame or resistance heating or other techniques by using lower fusion temperatures over longer times. Lower arc powers for longer durations limit dopant diffusion (dopant blooming) in the core and decrease other structural changes in fibers so that beams propagate through the splice with a reduced tendency to excite higher order modes. In the example of FIG. 3, the signal fiber 304 is continuous through the pump combiner 302 so that there are no additional splices to degrade beam quality.

Figure 4:
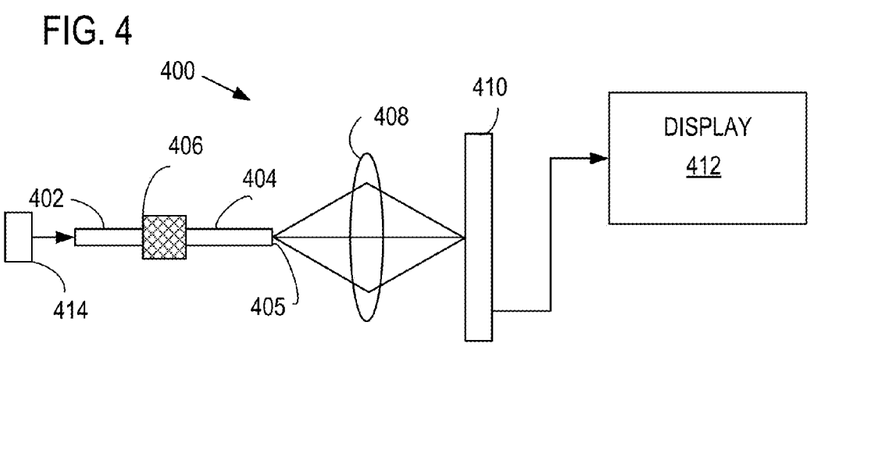
FIG. 4 illustrates an apparatus for assessing fiber splices.

Satisfactory ("fundamental mode conserving" or "mode conserving") splices can be identified by imaging an output beam profile with a camera or other array detector, and perturbing one or more of the spliced fibers at or near the splice. Touch sensitivity indicates an inferior splice. A representative splice evaluation system 400 is shown in FIG. 4. Fibers 402, 404 are coupled by a splice 406. An output facet 405 of the fiber 404 is imaged with a lens 408 onto an array detector 410. An image is coupled to a display 412 for viewing, or associated image data is coupled to a computer or other processing system for evaluation. A seed laser or other source 414 produces an optical beam that is directed into the fiber 402 for evaluation at an intended wavelength of operation.

Figure 5A:
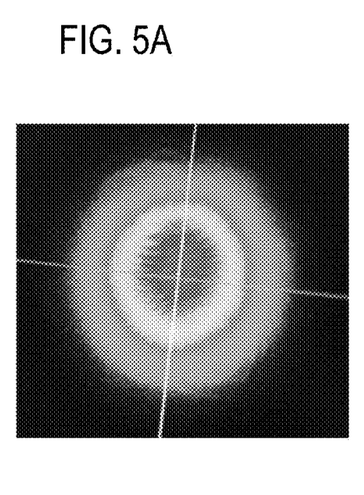
FIGS. 5A-5B illustrate beam profiles associated with a mode-preserving splice and a non mode-conserving splice.
Figure 5B:
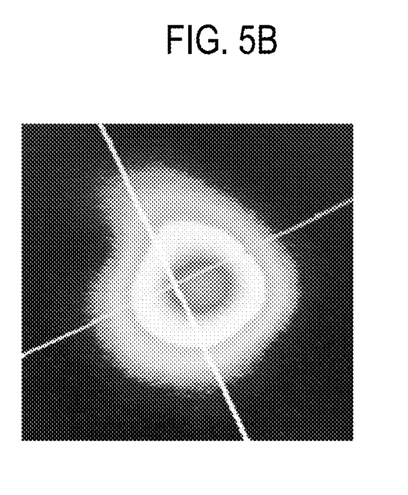

Representative images obtained with a system such as that of FIG. 4 are shown in FIGS. 5A-5B. FIG. 5A illustrates a suitable mode profile and FIG. 5B shows a mode profile obtained in response to perturbation of the fibers 402, 404 and the splice 406, indicating excitation of higher order modes. While in some examples, such touch sensitive splices can be used, alignment and packaging of systems using such splices can be challenging, even if otherwise acceptable.

Figure 6A:
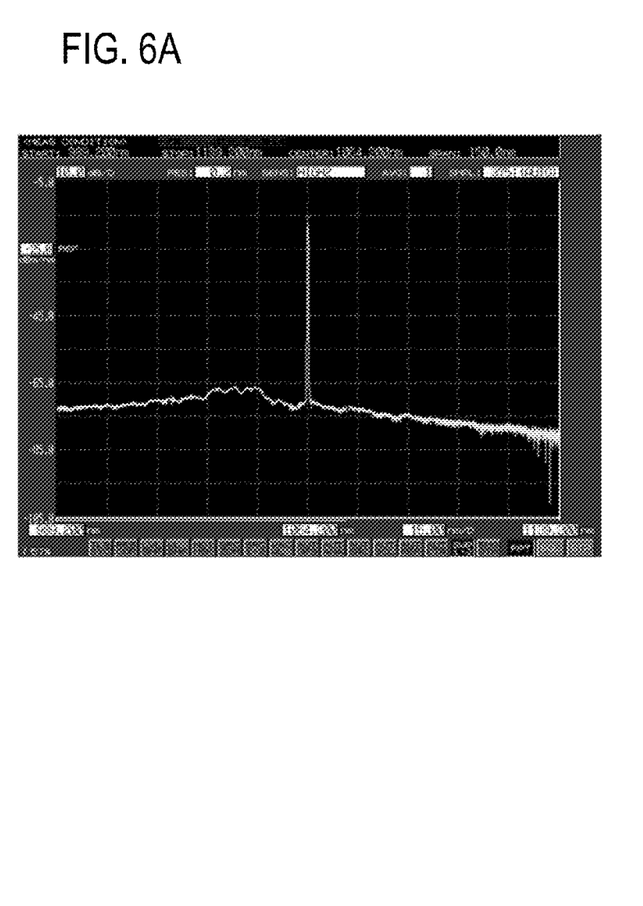
FIGS. 6A-6B illustrate spectral ripple introduced by a mode-preserving fiber splice and a splice that does not preserve fundamental mode operation, respectively.
Figure 6B:
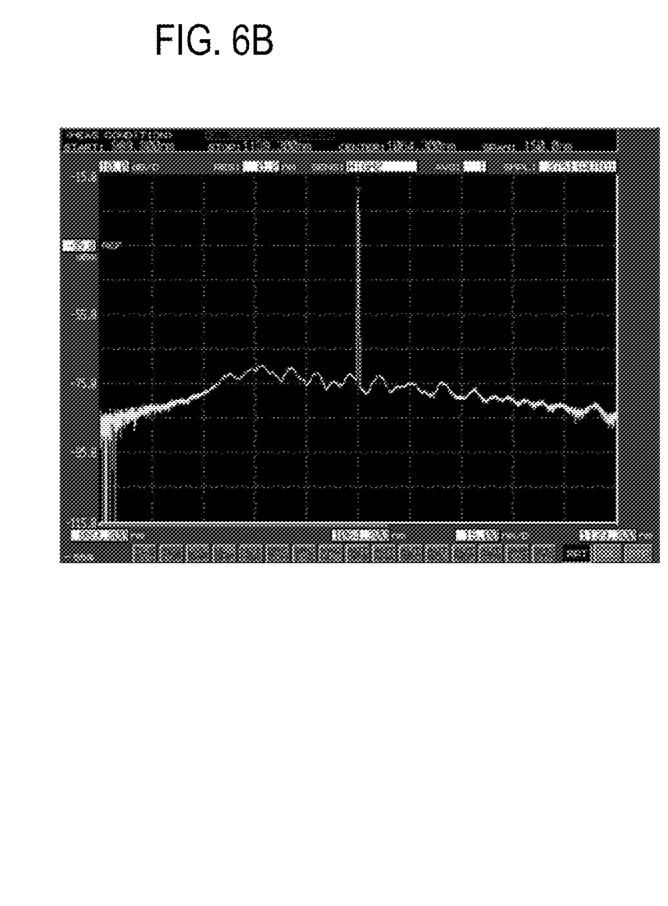

Inferior splices can also be identified based on spliced fiber spectral response. An optical flux from a broadband optical source or an amplified spontaneous emission source can be directed into spliced fibers. An output flux is directed to a spectrum analyzer to obtain transmission spectra. Ripple on the spectra generated by higher order mode propagation indicates that higher order modes have been excited. Representative spectra are shown in FIGS. 6A-6B. FIG. 6A indicates an acceptable splice, while FIG. 6B shows spectral ripple indicating higher order mode content. Typically, spectral ripples of amplitude of 5 dB, 4 dB, 3 dB, or 2 dB at 1, 2, 3, 4, or 5 or more frequencies are indicative of a mode altering splice.

Pump combiners can also degrade beam quality. Smaller pump fibers tend to produce less stress on a VLMA signal fiber. Such stress can degrade beam quality so that smaller pump fibers can be preferable. Any distortion of a VLMA signal fiber in combiner manufacturing can result in mode coupling in the combiner and mode beating at the output of an amplifier. Thus, the signal fiber is preferably processed in combiner manufacturing to reduce beam quality degradations. Beam combiners can be evaluated in the same manner as fiber splices based on mode profiles or output spectra as discussed above.

Figure 7:
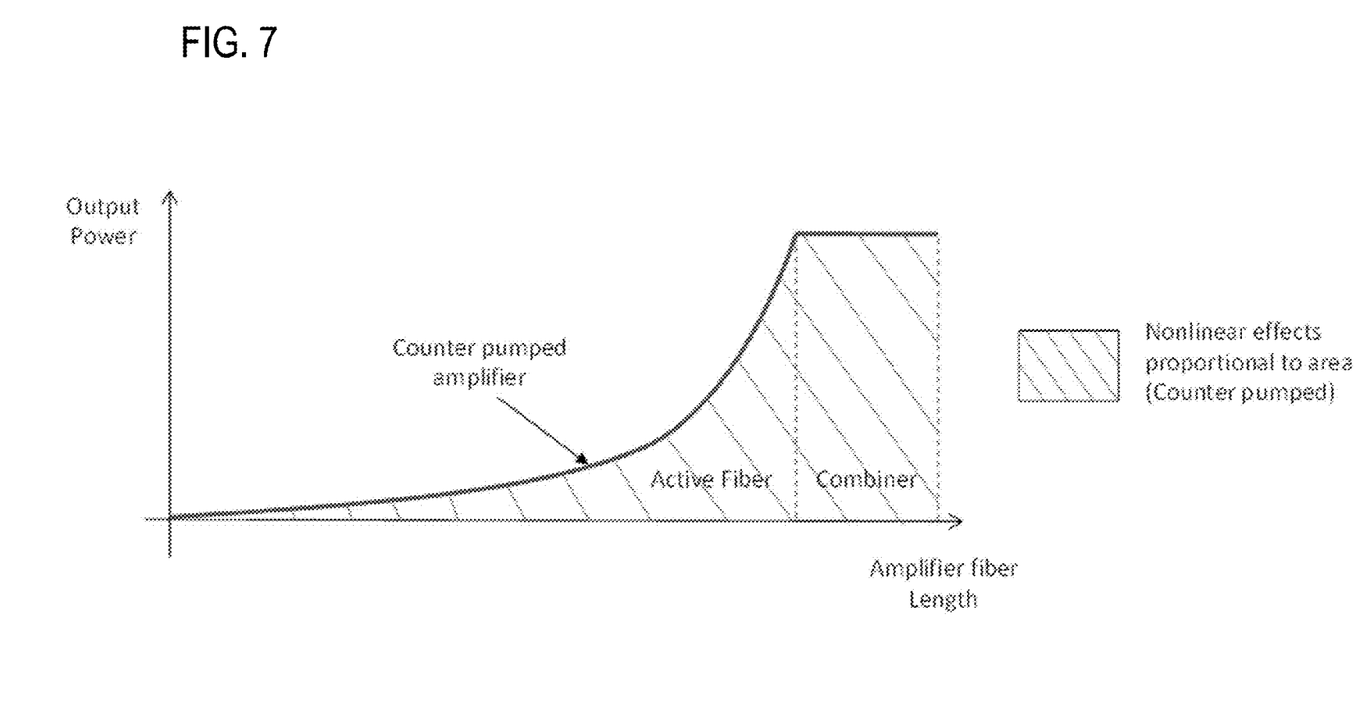
FIG. 7 illustrates a combiner contribution to non-linear effects in for a counter-pumped amplifier configuration.

The amplifier system of FIG. 3 includes a VLMA fiber length from the splice 320 to the end cap 306 that does not produce optical gain but increases the likelihood of non-linear effects. FIG. 7 illustrates a contribution of combiner fiber to non-linear effects. Based on FIG. 7, it is apparent that this fiber length can significantly increase the chances of experiencing non-linear effects. Thus, VLMA fiber lengths in and after a combiner should be as short as possible, or the end cap 306 situated on the VLMA signal fiber as the VLMA fiber exits a fused fiber region at the combiner 302.

Figure 8:
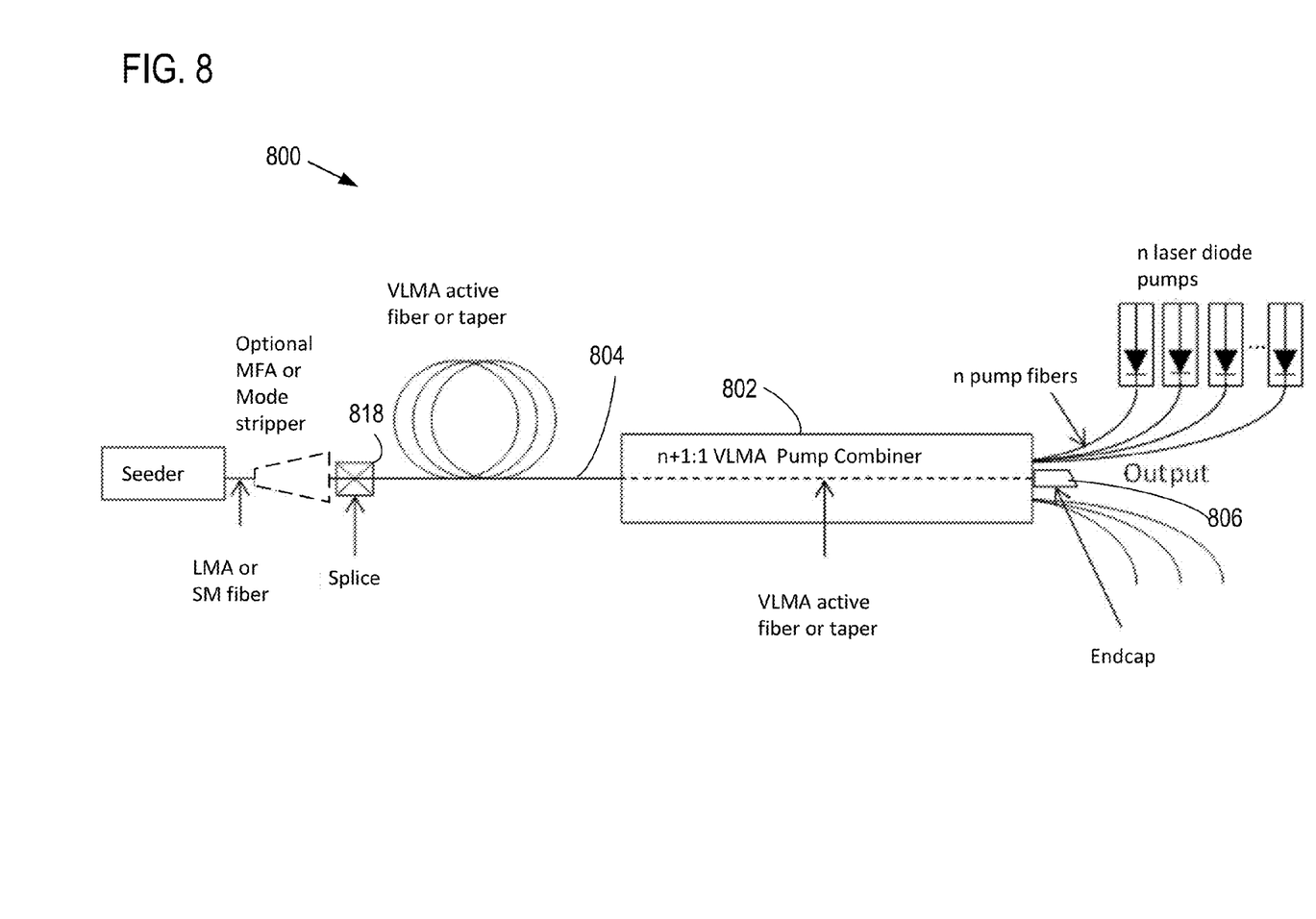
FIG. 8 illustrates a counter-pumped fiber amplifier that includes an active fiber that extends through an n+1:1 pump combiner as a signal fiber.

An alternative amplifier 800 is illustrated in FIG. 8. A pump combiner 802 includes an actively doped VLMA signal fiber 804 that extends from a splice 818 to an end cap 806 that is situated at the pump combiner 802. In this configuration, a splice is not needed to couple an active fiber to a combiner. In addition, additional fiber between a pump combiner and an end cap is eliminated. Thus, the deleterious effects of a splice and the additional fiber are eliminated.

Estimated maximum available peak powers as function of core size for VLMA and LMA Ytterbium-doped step index (0.07 NA) fiber amplifiers seeded at 1064 nm are listed in the table below, based on a common effective fiber length. Peak powers without fiber pigtails (i.e., a combiner at an end of an actively Yb-doped fiber) and with 30 cm long passive fiber pigtails on both sides of a combiner are listed.

| Signal fiber core diameter (μm) | MFD (μm) | Peak Power (no pigtails) (kW) | Peak Power (with pigtails) (kW) |
|---|---|---|---|
| 12 | 12.9 | 58 | 37 |
| 25 | 19.7 | 140 | 90 |
| 40 | 28.7 | 300 | 192 |
| 60 | 41.2 | 600 | 384 |

In additional examples, a triple clad signal fiber can be used in a pump combiner to further increase core diameter without substantial increases in numerical aperture. A laser diode pump that includes a volume Bragg grating (VBG) also permits reduction of the effective length of an active fiber or an active fiber taper.

Figure 9:
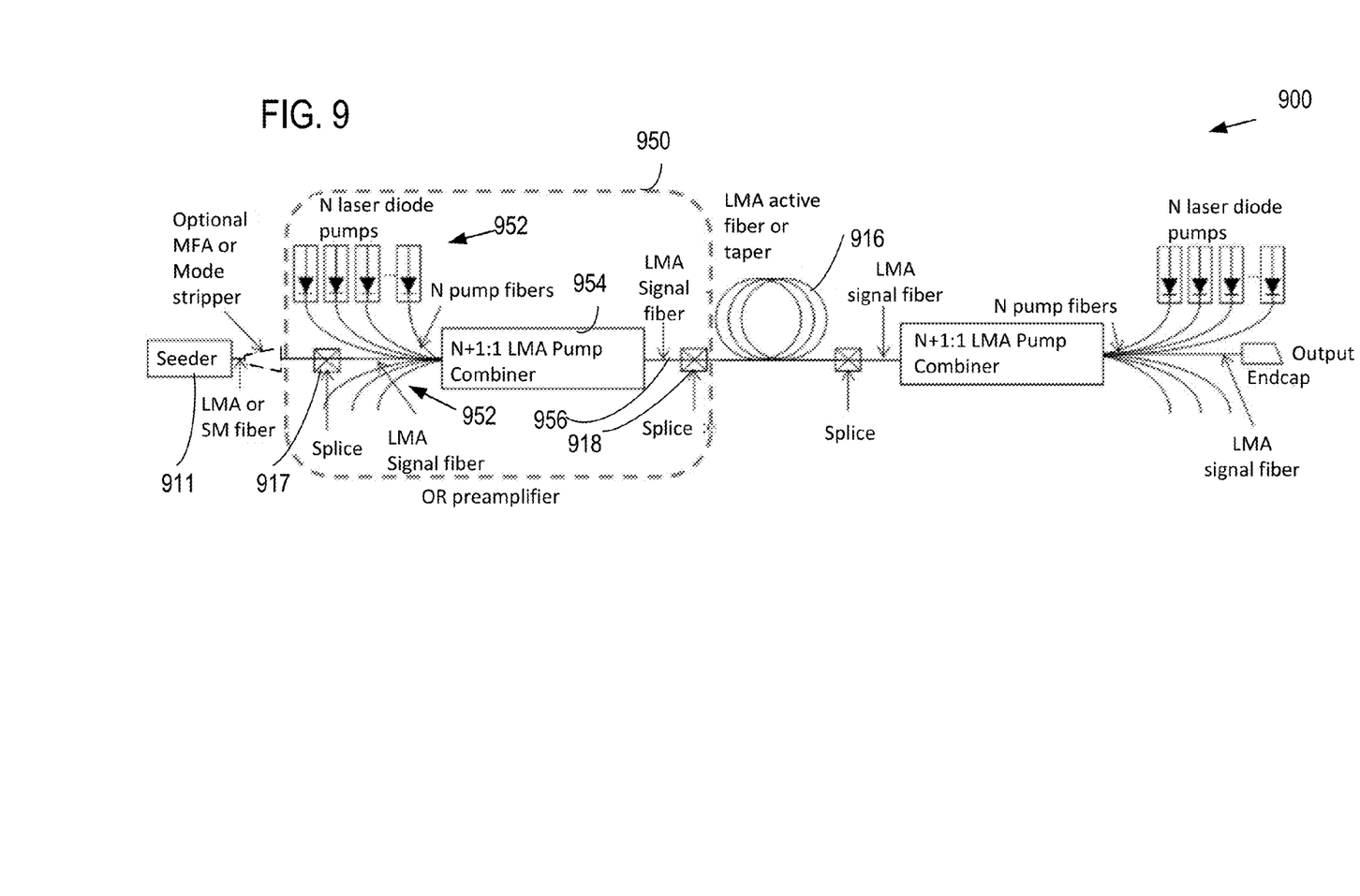
FIG. 9 illustrates a counter-pumped fiber laser with a seed laser that is amplified with a co-pumped active fiber.

With reference to FIG. 9, a co- and counter-pumped fiber laser 900 includes a seed laser 911 that produces optical seed pulses that are coupled to co-pump 950. The co-pump 950 is coupled to the seed laser 911 and an LMA active fiber (or fiber taper) 916 with splices 917, 918, respectively and includes pump lasers 952 and an n+1:1 pump combiner 954. The pump combiner 954 has an LMA signal fiber 956 and can have various pump fibers 958. Other features of the laser 900 are similar to those of the laser configurations of FIG. 3 and FIG. 8.

End Caps

Figure 10:
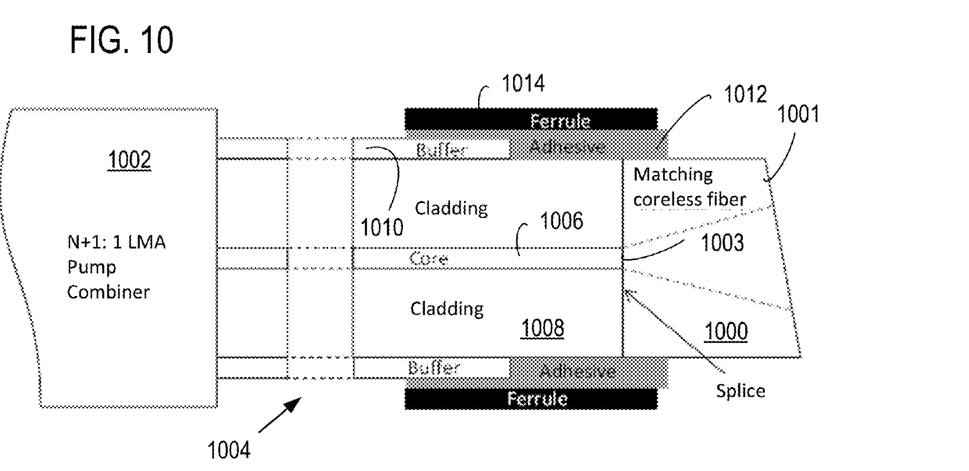
FIG. 10 is a sectional view of an n+1:1 pump combiner terminated with a coreless fiber end cap.

With reference to FIG. 10, a representative end cap 1000 is provided as a section of a coreless fiber, preferably selected to have a cladding diameter and index of refraction similar to that of a cladding 1008 of a signal fiber 1004. The signal fiber 1004 extends from an n+1:1 pump combiner 1002 having an LMA or VLMA core 1006. The signal fiber 1004 and the end cap 1000 is retained in a ferrule 1014 with an adhesive layer 1012, and an exit surface 1001 of the end cap 1000 is angled to eliminate or reduce reflections back into the core 1006. Alternatively, the exit surface 1001 can be antireflection coated (or coated and angled). The ferrule 1014 can receive the signal fiber 1004 with a portion of a buffer layer 1010 remaining. The signal fiber 1004 and the end cap 1000 are coupled with a splice 1003, preferably a mode preserving splice. A large diameter end cap is typically used for free space pumped systems to avoid clipping pump radiation due to the relatively high numerical aperture of pump beams. The fiber pumped lasers and amplifiers disclosed herein do not require large diameter end caps as they are not used to couple pump radiation to an active fiber, and high intensity laser radiation exiting at an end cap is substantially confined to a fundamental mode. Typical signal fibers have cladding diameters between 100 μm and 1 mm, between 125 μm and 500 μm, or between 125 μm and 250 μm.

Figure 11:
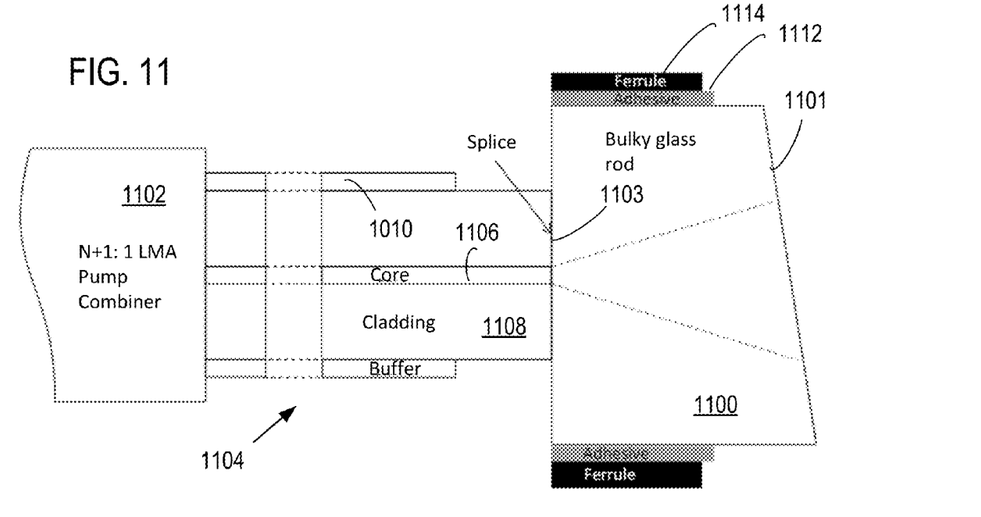
FIG. 11 is a sectional view of an n+1:1 pump combiner terminated with a glass rod.

FIG. 11 illustrates an end cap 1100 that is a section of a glass or silica rod that is secured to a signal fiber 1104 with a splice 1103. The signal fiber 1104 has a core 1006, a cladding 1108, and a buffer layer 1110 and extends from an n+1:1 pump combiner 1102. The end cap 1100 can be retained in a ferule 1114 and secured with an adhesive layer 1112. An exit surface 1101 is generally angled or anti-reflection coated, or both. Due to confinement of a high power in a fundamental mode in the signal fiber, the adhesive layer 1112 can contact the cladding 1008 and the buffer layer 1110 can be removed. The ferrules 1014, 1114 of FIGS. 10-11 can be metallic or made of an optically transparent material such as glass. Ferrules can be provided with an alignment key so that a selected angular orientation can be provided.

Splice and Pump Combiner Selection

Figure 12:
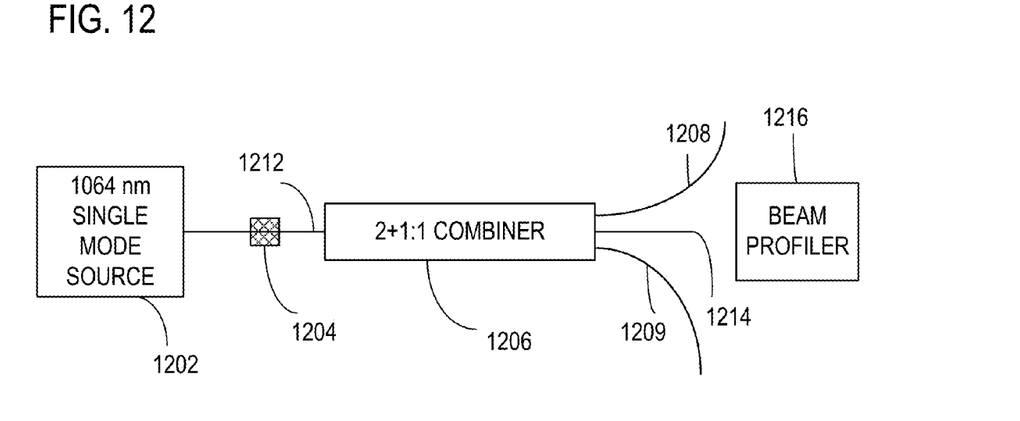
FIG. 12 illustrates a representative apparatus for evaluation of pump combiners.
Figure 13A:
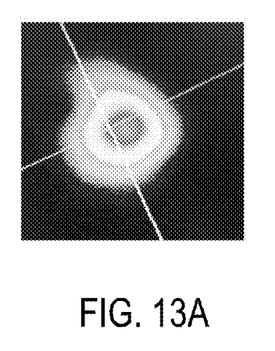
FIGS. 13A-13B illustrate beam cross-sections obtained with an apparatus such as that of FIG. 12.
Figure 13B:
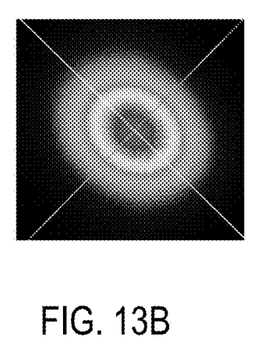

An assortment of nominally identical 2+1:1 pump combiners having passive signal fibers (double clad polarization maintaining, 25 μm core diameter, 250 μm cladding diameter, numerical apertures 0.07, 0.46 for core and cladding) and pump fibers (200 μm diameter, numerical aperture 0.22) was evaluated to select mode-preserving combiners. A representative test system is illustrated in FIG. 12. A single mode source 1202 at an intended laser wavelength (1064 nm in this example) is coupled through a splice 1204 to a signal fiber 1212 of a combiner 1206. The combiner includes pump fibers 1208, 1209, and the signal fiber 1212 is terminated at a straight cleaved surface 1214. A beam profiler 1206 is situated to receive an output beam and provide beam quality estimates that can be used to evaluate the combiner 1206. In one approach, values of a beam quality factor $M^2$ are determined along two orthogonal axes in a beam cross-section, wherein the axes are selected to provide a maximum or near maximum difference for the associated $M^2$ values. FIGS. 13A-13B show representative beam cross sections and axes along which $M^2$ values are determined. Touch sensitivity of $M^2$ values is generally also evaluated. Mode preserving couplers are those for which $M^2$ values are less than 1.30, 1.25, or 1.20 along both axes, and/or a difference in $M^2$ values is less than 0.20, 0.15, 0.10, or 0.08. Couplers that are touch sensitive are generally unacceptable as well, even if $M^2$ values indicate otherwise.

Figure 14:
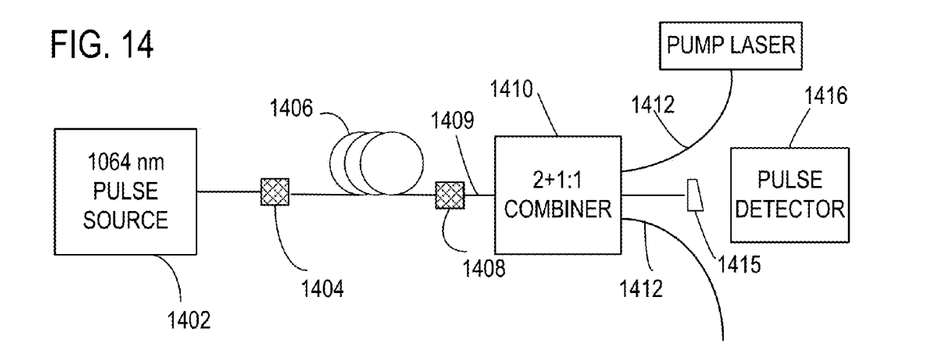
FIG. 14 illustrates a pulse measurement system for the evaluation of pump combiners.

Pulse measurements can also be used to identify suitable combiners and splices. A representative system for pulse-based evaluation is shown in FIG. 14. A pulsed seed laser 1402 is coupled via a splice 1404 to an active fiber 1406 which is in turn coupled via a splice 1408 to a signal fiber 1409 of a combiner 1410. In one example, the pulse seed laser provided 1.3 ns pulses at 1064 nm. A pump laser or lasers are coupled to one or more pump fibers 1412, and an output beam from the signal fiber 1409 is coupled to a pulse detection system 1416 from an angled end cap 1415. In one example, the active fiber was a 2.5 m length of Yb-doped, 25/250 DC-PM fiber manufactured by LIEKKI.

Figure 15A:
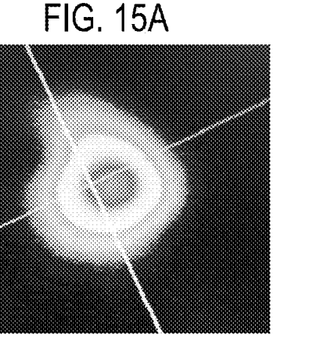
FIGS. 15A-15B illustrate a beam cross-section and pulse response indicative of combiner-induced beam degradation.
Figure 15B:
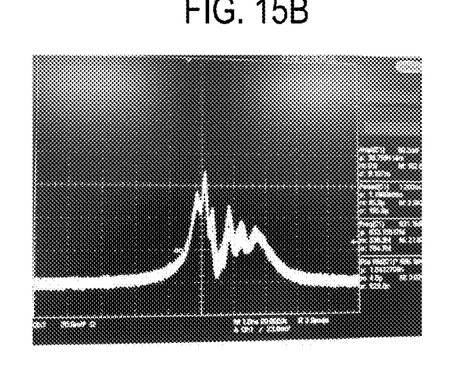
Figure 16A:
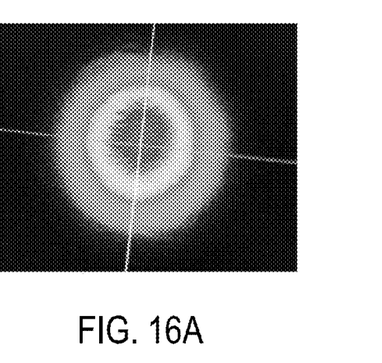
FIGS. 16A-16B illustrate a beam cross-section and pulse response in the absence of pump combiner-induced degradation.
Figure 16B:
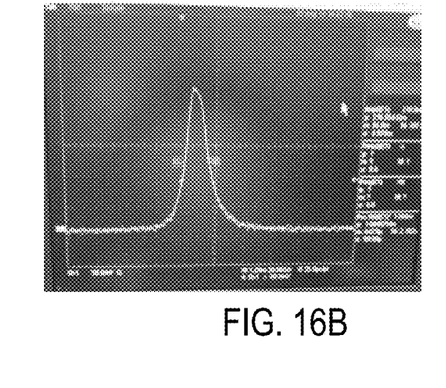

FIGS. 15A-15B illustrate combiner-induced beam degradation. FIG. 15A is a beam profile such as shown above, and beam deviation from fundamental mode is apparent. FIG. 15B shows a multiple pulse or ringing pulse output in response to a single 1.3 ns pulse from the pulse source 1402. For comparison, FIGS. 16A-16B show operation with free space pumping (i.e., without the combiner 1410), demonstrating that the combiner 1410 can be associated with the cross-sectional and temporal features of FIGS. 15A-15B.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A pulsed fiber laser, comprising:
   a seed pulse source; and
   a mode preserving pump combiner coupled to at least one pump source, wherein the pump combiner includes an active signal fiber that extends through the pump combiner, and at least one pump fiber coupled to at least one pump source so as to deliver pump radiation to the active signal fiber, wherein the active signal fiber is coupled to receive a seed pulse from the seed source and to deliver an output beam based on the seed pulse.

2. The pulsed fiber laser of claim 1, wherein the active signal fiber is a large mode area fiber.

3. The pulsed fiber laser of claim 2, wherein the active signal fiber is a double clad fiber.

4. The pulsed fiber laser of claim 1, wherein the active signal fiber is a very large mode area fiber.

5. The pulsed fiber laser of claim 4, wherein the active signal fiber is a double clad fiber.

6. The pulsed fiber laser of claim 1, wherein a laser wavelength is 1064 nm, and the signal fiber produces a peak output power of at least 100 kW.

7. The pulsed fiber laser of claim 1, wherein the mode preserving pump combiner produces a transmitted seed pulse with an $M^2$ value of less than 1.25.

8. The pulsed fiber laser of claim 1, further comprising a seed fiber that delivers the seed pulse to the active signal fiber of the mode preserving pump combiner and that is coupled to the active signal fiber with a mode-preserving splice.

9. The pulsed fiber laser of claim 1, wherein the seed pulse is coupled to a seed fiber, and the seed fiber is coupled to the active signal fiber with a mode-preserving splice.

10. The pulsed fiber laser of claim 1, further comprising an end cap secured to an output end of the active signal fiber, the end cap having a diameter corresponding to a diameter of the active signal fiber.

11. The pulsed fiber laser of claim 1, wherein the active signal fiber is a tapered fiber.

12. The pulsed fiber laser of claim 1, wherein the active signal fiber is counter-pumped.

13. A pulsed fiber laser, comprising:
    a seed pulse source;
    a pump source;
    an active fiber coupled to receive a seed pulse from the seed source; and
    a pump combiner having at least one pump fiber coupled to the pump source so as to deliver pump radiation to an active fiber wherein the active fiber extends through the pump combiner.

14. The pulsed fiber laser of claim 13, further comprising an end cap situated at an output end of the active fiber, wherein the end cap has a diameter corresponding to a diameter of the active fiber.

15. The pulsed fiber laser of claim 14, wherein the seed pulse source is coupled to a fiber pigtail, and further comprising a splice that couples the fiber pigtail to the active fiber.

16. The pulsed fiber laser of claim 15, wherein the active fiber is splice-free between the splice at the fiber pigtail and the end cap.

17. The pulsed fiber laser of claim 13, wherein the active fiber is a large mode area or very large mode area fiber between the seed laser and the pump combiner.

18. The pulsed fiber laser of claim 13, wherein the active fiber is a tapered fiber between the seed laser and the pump combiner.

19. The pulsed fiber laser of claim 13, wherein the pump combiner is a mode preserving pump combiner.

20. The pulsed fiber laser of claim 13, wherein a peak output power is at least 10 kW.

21. The pulsed fiber laser of claim 13, wherein the active fiber is counter-pumped.

22. A method, comprising:
    selecting a mode-preserving pump combiner having a signal fiber and a pump fiber wherein the mode-preserving pump combiner is selected based on spectral ripple in response to a broadband beam propagating in the signal fiber, based on a temporal characteristic of an optical beam transmitted by the signal fiber, or based on $M^2$ values along orthogonal axes of a beam profile; and
    coupling the signal fiber to an active fiber and the pump fiber to a pump source.

23. The method of claim 22, wherein the mode-preserving pump combiner is selected based on at least one $M^2$ value along a beam profile.

24. The method of claim 23, wherein the mode-preserving pump combiner is selected based on $M^2$ values along orthogonal axes of a beam profile.

25. The method of claim 24, wherein the $M^2$ values are less than about 1.25.

26. The method of claim 23, wherein the mode-preserving pump combiner is selected based on spectral ripple in response to a broadband beam propagating in the signal fiber.

27. The method of claim 23, wherein the mode-preserving pump combiner is selected based on a temporal characteristic of an optical beam transmitted by the signal fiber.

28. The method of claim 23, further comprising coupling at least one of the signal fiber to the active fiber or the pump fiber to a pump source with a mode preserving fiber splice.

29. The pulsed fiber laser of claim 1, further comprising a ferrule situated about the end cap and a portion of the active signal fiber.

* * * * *